(12) United States Patent
Wallis et al.

(10) Patent No.: US 10,570,263 B2
(45) Date of Patent: Feb. 25, 2020

(54) DEGRADABLE SHEET MATERIAL (71) Applicant: POLYMATERIA LIMITED, London (GB)

(72) Inventors: Christopher Wallis, London (GB); Graham Chapman, London (GB); Gavin Hill, London (GB)

(73) Assignee: Polymateria Limited, London (GB)

( * ) Notice: Subject to any disclaimer, the term of this patent is extended or adjusted under 35 U.S.C. 154(b) by 0 days.

(21) Appl. No.: 16/479,326

(22) PCT Filed: Jan. 8, 2018

(86) PCT No.: PCT/EP2018/050375
§ 371 (c)(1),
(2) Date: Jul. 19, 2019

(87) PCT Pub. No.: WO2018/134071
PCT Pub. Date: Jul. 26, 2018

(65) Prior Publication Data
US 2019/0352476 A1   Nov. 21, 2019

(30) Foreign Application Priority Data

Jan. 20, 2017 (EP) ..................... 17152496
Jan. 20, 2017 (EP) ..................... 17152497

(51) Int. Cl.
*C08J 5/18* (2006.01)
*B65D 65/46* (2006.01)
(Continued)

(52) U.S. Cl.
CPC .............. *C08J 5/18* (2013.01); *B65D 65/466* (2013.01); *C08J 11/14* (2013.01); *C08L 23/06* (2013.01);
(Continued)

(58) Field of Classification Search
CPC . C08J 5/18; C08J 11/14; C08J 2323/06; C08J 2323/12; C08J 2409/06;
(Continued)

(56) References Cited

U.S. PATENT DOCUMENTS 4,016,117 A   4/1977   Griffin
4,931,488 A   6/1990   Chiquet
(Continued)

FOREIGN PATENT DOCUMENTS

KR   20050007872 A   1/2005

OTHER PUBLICATIONS

International Search Report and Written Opinion, PCT/EP2018/050375, dated Mar. 12, 2018, 10 pages.
(Continued)

*Primary Examiner* — Michael C Miggins
(74) *Attorney, Agent, or Firm* — Stinson LLP (57) ABSTRACT

A sheet material formed of a degradeable composition comprising 30 to 80 wt % calcium carbonate, an additive, and the balance a polymer selected from polyethylene, polypropylene and copolymers and blends thereof. The additive comprises (a) two or more transition metal compounds, (b) a mono- or poly-unsaturated $C_{14}$-$C_{24}$ carboxylic acid, or an ester, anhydride or amide thereof, (c) a synthetic rubber. The addition optionally comprises (d) dry starch, and/or (e) calcium oxide, and/or (f) a phenolic antioxidant stabilizer. The two or more transition metal compounds are selected from iron, manganese, copper, zinc, titanium, cobalt and cerium compounds and the transition metals in the two or more transition metal compounds are different.

17 Claims, 2 Drawing Sheets

(51) Int. Cl.
    *C08J 11/14*         (2006.01)
    *C08L 23/06*        (2006.01)
    *C08L 23/12*        (2006.01)

(52) U.S. Cl.
    CPC ........... *C08L 23/12* (2013.01); *C08J 2323/06* (2013.01); *C08J 2323/12* (2013.01); *C08J 2403/02* (2013.01); *C08J 2409/06* (2013.01); *C08L 2201/06* (2013.01); *C08L 2205/03* (2013.01)

(58) Field of Classification Search
    CPC ....... B65D 65/466; C08L 23/06; C08L 23/12; C08L 2201/06; C08L 2205/03
    See application file for complete search history.

(56) References Cited

U.S. PATENT DOCUMENTS

| | | |
|---|---|---|
| 5,565,503 A | 10/1996 | Garcia et al. |
| 2003/0190443 A1 | 10/2003 | McCarthy |
| 2004/0062884 A1 | 4/2004 | Hao |
| 2012/0071574 A1 | 3/2012 | MacLeod |
| 2012/0267368 A1 | 10/2012 | Wu et al. |

OTHER PUBLICATIONS

European Search Report, Application No. 17152497.8, dated Jul. 12, 2017, 7 pages.

European Search Report, Application No. 17152496.0, dated Jul. 12, 2017, 7 pages.

FIG. 1

FIG. 2

DEGRADABLE SHEET MATERIAL

REFERENCE TO RELATED APPLICATIONS

This application is a US national stage application based on PCT/EP2018/050375 filed Jan. 8, 2018 claiming priority to EP17152496.0 and 17152497.8 filed Jan. 20, 2017, the entire disclosures of which are incorporated herein by reference.

FIELD OF THE INVENTION

The present invention relates to a disposable sheet material suitable for use as packaging or for forming a container. The sheet material is especially suitable for use where a waterproof material is required for a single- or temporary-use. A preferred application is a disposable beverage container for holding hot or cold beverages, commonly referred to as a "coffee cup". The material described herein is particularly advantageous since it readily degrades and addresses concerns with the slow degradation of standard packaging materials.

BACKGROUND

Every day tons of paper packaging materials are thrown away. Since the product appears to be made of paper, the end consumer wrongly assumes that the material will quickly degrade which may encourage them to litter, or may even expect the material to be recyclable and place the material in a recycling bin. However, where a paper material has been made waterproof this is commonly by fusing paper with polyethylene, a material that cannot be separated out again in a standard recycling process, and which prevents the material quickly degrading when littered.

This is a particular problem for coffee cups, which are used to sell take-away beverages such as coffee and tea from high-street shops such as coffee shops. These cups are typically made from card which has been treated to be waterproofed and may be provided with a separate or integrated sleeve to insulate the contents and protect the consumers' hands from hot or cold beverage liquids.

It is also known to provide plastic packaging materials and containers, including plastic coffee cups. The use of such polymer materials have many benefits and can provide strong, chemically and biologically inert materials at relatively low cost. Unfortunately many of these characteristics make them difficult to dispose of without causing lasting damage to the environment. The very short functional life of plastic containers leads to rapid build-up of waste material which is inert to most physical and chemical action to which they are subjected during conventional disposal.

As the global population becomes more aware of the human effect on our climate, our ecosystems and the planet as a whole, there is growing demand to increase the amount of waste which is recycled. Accordingly, there is a growing demand for alternatives to conventional polymer materials.

Several degradable polymer compositions have been developed. However, there are significant disadvantages associated with these conventional degradable polymers. Conventional degradable polymers (such as aliphatic polyesters) are generally more difficult and complicated to process, resulting in lower output. These materials have significantly higher densities and lower strength than conventional non-degradable commodity polymers.

U.S. Pat. No. 4,016,117 discloses the use of biodegradable filler materials, such as starch, and an autoxidising substance such as a fat which, when exposed to transition metals in soil, yield peroxides which attack carbon-carbon linkages in the resin.

U.S. Pat. No. 4,931,488 discloses the addition of a biologically degradable substance (starch), an iron compound (FeOH(stearate)2), and a fatty acid or fatty acid ester (such as soya oil which is a mix of fatty acid esters) to a thermoplastic polymer. The resultant plastic composition degrades under the action of heat and/or ultraviolet light and/or insolation. These compositions have disadvantageous abiotic degradation and biodegradation rates.

The modern consumer is becoming increasingly aware of their social responsibilities and their carbon footprint. Accordingly there is increased adverse publicity associated with this waste issue and an environmentally friendly alternative is urgently being sought. Accordingly, it is desirable to provide a degradable sheet material suitable for use in forming packaging or containers, especially coffee cups and/or tackle at least some of the problems associated with the prior art or, at least, to provide a commercially useful alternative thereto. In particular, there is a desire to provide a packaging material or wrapping which is recyclable and in addition, especially if littered, is readily degradable.

SUMMARY OF THE INVENTION

According to a first aspect, the present invention provides a sheet material formed of a degradable composition, the composition comprising:

30 to 80 wt % calcium carbonate by weight of the composition;

an additive; and the balance a polymer selected from polyethylene, polypropylene and copolymers and blends thereof, wherein the additive comprises, by combined weight of the additive and the polymer:

(a) two or more transition metal compounds in a total amount of from 0.15 to 0.6 wt %;

(b) a mono- or poly-unsaturated C14-C24 carboxylic acid, or an ester, anhydride or amide thereof, in an amount of from 0.04 to 0.08 wt %;

(c) a synthetic rubber in an amount of from 0.04 to 0.2 wt %;

and, optionally:

(d) dry starch in an amount of from 0 to 20 wt %; and/or (e) calcium oxide in an amount of from 0 to 1 wt %; and/or (f) a phenolic antioxidant stabilizer in an amount of from 0 to 0.2 wt %;

wherein the two or more transition metal compounds are selected from iron, manganese, copper, zinc, titanium, cobalt and cerium compounds and wherein the transition metals in the two or more transition metal compounds are different.

Preferably the sheet material is a disposable coffee cup. Although the following disclosure focuses on sheet materials, the disclosure applies equally to an embodiment where the sheet material is in the form of a disposable coffee cup.

Preferably the additive substantially consists of the listed components (a) to (f). Preferably the composition substantially consists of the additive, calcium carbonate and the polymer. That is, preferably the composition comprises less than 5 wt % of other ingredients, more preferably less than 1 wt % and most preferably comprises no other ingredients.

DETAILED DESCRIPTION OF PREFERRED EMBODIMENTS

Figure 1:
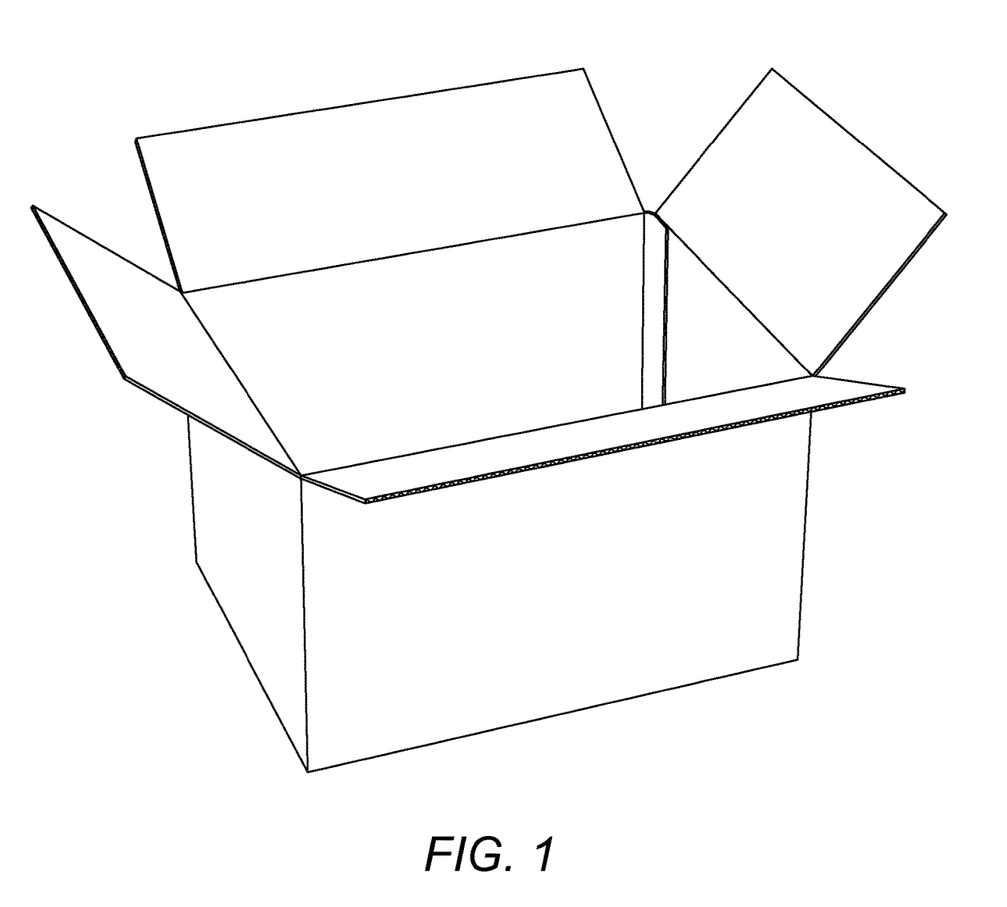
FIG. 1 shows a container of the invention.
Figure 2:
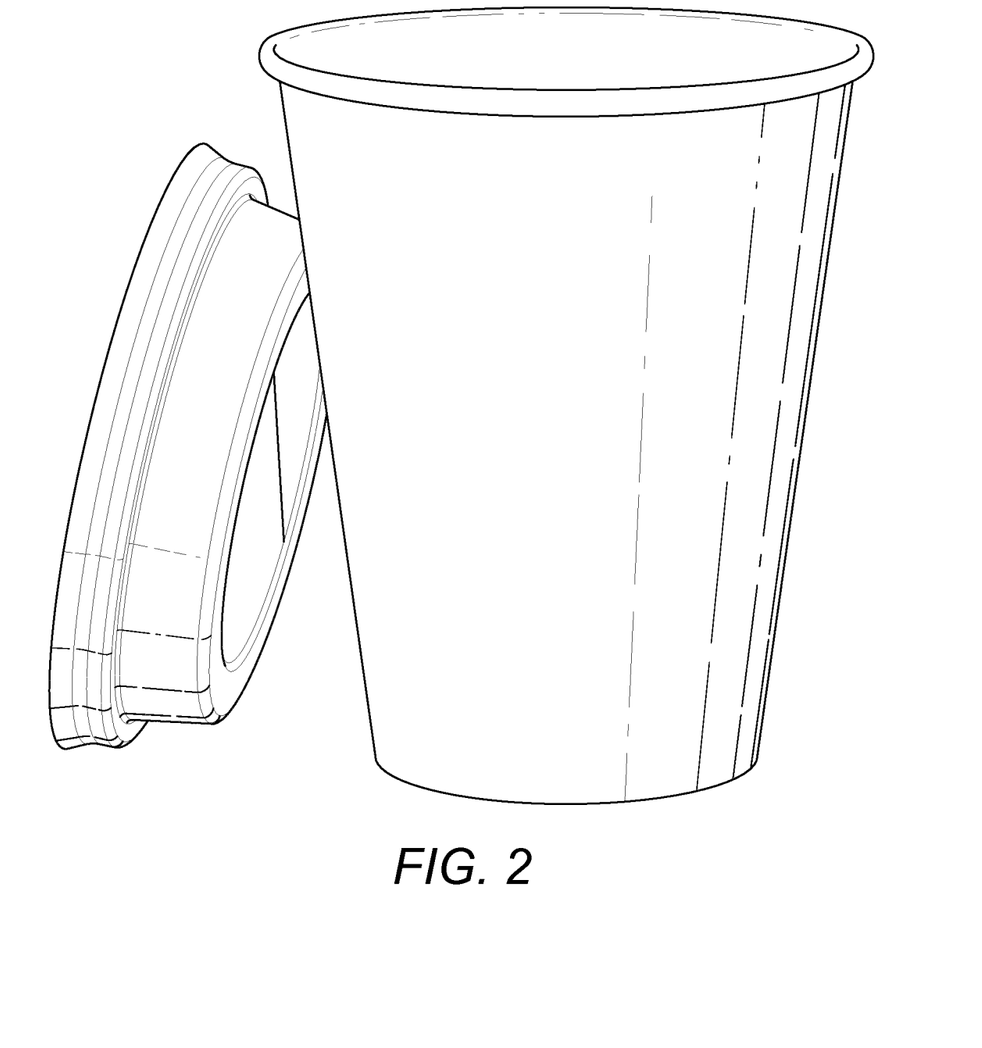
FIG. 2 shows a container of the invention in the form of a coffee cup with a lid.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a sheet material which can be used for packaging or to form a container. One example of the sheet is a conventional burger wrapping. This is a thin waterproof wrapping which is often discarded by a consumer falsely believing it to be readily degradable. Another example is a moulded container, or folded and glued container such as food carton for use in conveying take-away foods. Other examples include product packaging for general retail use. Advantageously the compositions disclosed herein may be heat-sealed to form closed containers or sealed packaging.

A disposable coffee cup is a container suitable for holding a single serving of a beverage and from which a consumer can imbibe the beverage. Typically such a container has a volume of from 30 ml to 1 l, and more typically from 200 to 350 ml. The container is suitable for holding a hot beverage at a temperature of up to 100° C., although typically the peak temperature in use is only 80 to 95° C. The container is, therefore, waterproof within the time period expected for use, i.e. at least 1 day. The coffee cup is disposable meaning that it is intended to be disposed of after use, rather than reused for another beverage. The container has an opening through which the container may be filled and emptied.

Typical coffee cups are a hollow frustroconical body with a base and with a narrower diameter at the base such as from 3 to 8 cm and a wider diameter at the top/mouth such as from 5 to 10 cm, with a height such as from 5 to 15 cm. Typical weights for the coffee cup are from 5 to 20 g, and usually about 10-12 g.

The sheet material is formed of a degradable composition. The following description uses the term degradable to refer to the synthetic polymer components which breakdown into $CO_2$, $H_2O$, biomass and inorganic salts under normal composting conditions and in other environments. As will be appreciated, the calcium carbonate does not breakdown, but is left as an inert powder component once the polymer has degraded. Thus, the following discussion refers interchangeably to the degradation of the composition and the degradation of the polymer which forms the structure of the sheet. Advantageously, the sheets described herein are even recyclable since calcium carbonate/polyethylene masterbatch is often added to recyclate to improve processing. That is, the high calcium carbonate content does not prevent recycling. Due to the low levels of polymer, the sheets may even be compostable under certain conditions.

The composition comprises 30 to 80 wt % calcium carbonate, by weight of the composition. Calcium carbonate is cheap, naturally abundant and renewable. It is widely used in personal care applications, paper whitening, indigestion tablets and the like. If oxidised it forms lime (Calcium Oxide) which is commonly added to drinking water. Calcium carbonate can be sourced from chalk mines, seashells or eggshells. Preferably the composition comprises from 50 to 75 wt % and most preferably from 60 to 70 wt % calcium carbonate.

The addition of calcium carbonate provides a robust final material which fragments easily once degradation has begun and has a low cost and impact on the environment. Preferably the calcium carbonate has a mean longest diameter of from 1 to 30 microns, preferably 1 to 20 microns. This is desired for good distribution within the polymer and permits ready processing of the composition, including extrusion.

The calcium carbonate is held within a polymer selected from polyethylene, polypropylene and copolymers and blends thereof. These polymers preferably provide from 19 to 69 wt % of the composition, with the balance additive and calcium carbonate. Preferably the polymer is HDPE. Preferably the polymer has a melt-flow index of from 10 to 20, since this allows good processing of the composition comprising the calcium carbonate as described herein.

The inclusion of calcium carbonate in a polymer is known. For example, Natural Mineral Paper (NMP) is a composite material consisting of mostly calcium carbonate (rock mineral) up to 80% and an organic binder HDPE (high density polyethylene). This material was invented in the 1970's and has only found a use in niche markets such as luxury gift bags, labels, baggage tags, and stationery.

Furthermore, adding calcium carbonate to polyolefins is popular at the moment as it can be used to improve processing times and reduce costs by adding weight/volume to materials, reducing costs. These materials can also have improved tensile properties and light barrier properties. Masterbatches have now been developed that can improve processing for recycled products, by improving miscibility between different polymers, especially in the case of 3 or 5-layer films containing a gas barrier layer.

The "paper" forming the Natural Mineral Paper maintains many of the properties of paper such as a clean dead-fold and good retention of inks, but it is also waterproof, tear resistant and much cheaper and cleaner to produce as it uses less energy, water and does not require bleaching agents. Many of the current manufacturers claim that it is photodegradable, perhaps as a result of Ferric Oxide impurities in the chalk, but do not give a timeline for degradation—and given this property have not considered a wider potential for use. The current generation of Stone Paper (NMP) typically contains calcium carbonate to HDPE at ratios of 80:20 for sheet thicknesses of less than 300 μm (for use as printing paper, labels etc., paper-like bags), and 60:40 for sheet thicknesses of more than 300 μm (for use as card, glossy boxes and the like).

The composition of the sheet material discussed herein may contain other particulates in addition to the calcium carbonate and other ingredients described herein, such as other particulates of metal carbonates and metal oxides. However, the presence of such additional particulates is preferably less than 20 wt %, more preferably less than 5 wt % and most preferably less than 1 wt % by weight of the composition. In a preferred embodiment the composition consists of the ingredients described herein without any further particulates.

The polymer further comprises an additive which is responsible for achieving the degradable properties of the composition. The additive is described herein with respect to the combined weight of the additive and the polymer. In practice when making a composition for a sheet material, the additive may be pre-formed as a masterbatch with an amount of polyethylene, polypropylene and copolymers and blends thereof, before being mixed with the bulk polymer and calcium carbonate.

The additive comprises, by combined weight of the additive and polymer, two or more transition metal compounds in a total amount of from 0.15 to 0.6 wt %, preferably 0.2 to 0.3 wt %. The following description uses the term transition metal to refer to any of the metallic elements of groups IVB-VIII, IB, and IIB, or 4-12 in the periodic table. Preferred transition metals are iron, manganese, copper, cobalt and cerium, preferably where the iron is used it is in the +3 oxidation state and where copper is used it is in the +2 oxidation state. These compounds catalyse the degradation. Including large amounts of transition metal increases the cost of the degradable composition and may lead to transition metal build-up in waste disposal sites. Additionally, since the transition metal plays a catalytic role in the degradation process, increasing the transition metal content above these amounts has a decreasing impact on the degradation rate.

The two or more transition metal compounds are selected from iron (preferably ferric), manganese, copper, zinc, titanium, cobalt and cerium compounds and the transition metals in the two or more transition metal compounds are different.

Preferably the transition metal in the two or more transition metal compounds comprise:
 (i) iron, manganese and copper; or
 (ii) manganese and copper; or
 (iii) iron and manganese.

The temperature of the polymer composition as well as its exposure to light may also affect its degradation rate. The present inventors have surprisingly found that the choice of transition metal can be used to further tune these effects. In particular the present inventors have found that iron is a more efficient photo catalyst whilst manganese is a more efficient thermal catalyst of the degradation process. The transition metal component may, therefore, be used to tune the degradation rate depending on the expected exposure to heat and light of a particular product.

Specific transition metals may have effects on the properties of the polymer composition. For example, iron compounds may colour the polymer composition.

Additionally, other metals such as copper advantageously increase the degradation rate but may make the polymer composition unsuitable for certain applications due to its toxicity. In colour sensitive compositions iron may be avoided. For use in the food industry copper may be avoided.

Preferably the transition metal compounds comprise moieties selected from stearate, carboxylate, acetylacetonate, triazacyclononane or combinations of two or more thereof. Preferably, the transition metal compounds may be present with a weight ratio of iron stearate and manganese stearate to copper stearate is from 4:1 to 8:1. Preferably, the transition metal compounds may be present with a weight ratio of ferric stearate and manganese stearate to copper stearate is from 4:1 to 8:1.

Alternatively or in addition, certain non-ionic ligands that play an active role in the degradation may also be included. Where present, the non-ionic ligands are preferably selected from amines, imines, amides, phosphites, phosphines, and carbenes. The present inventors have found that such non-ionic ligands can have an advantageous effect on the degradation rate of the composition whilst maintaining the essential material properties. Non-ionic ligands preferably constitute at least 5% of the ligands and preferably up to 50% of the ligands, preferably 10 to 40% of the ligands.

Preferably the transition metal ligands are chosen in order to make the transition metal physically and chemically compatible with the polymer. Advantageously, ligand selection may affect the transition metal's catalytic activity. The ligands may be chosen to make the metal compatible with the particular polyolefin used and to control the degradation rate of the polymer composition.

Preferably, the ligands of the metal compounds are inorganic ligands and/or saturated organic ligands. Preferably the ligands of the metal compounds do not comprise mono- or poly-unsaturated C14-C24 carboxylic acid, or an ester, anhydride or amide thereof.

The additive comprises a mono- or poly-unsaturated C14-C24 carboxylic acid in an amount of from 0.04 to 0.08 wt %, preferably 0.04 to 0.06 wt % by combined weight of the additive and polymer. The following description uses the term carboxylic acid to refer to the range of molecules containing a carboxylic acid —(COOH) moiety. The carboxylic acid of the present invention is mono- or poly-unsaturated and has a carbon backbone containing between 14 and 24 carbon atoms, meaning it has at least one double bond in the carbon backbone. The carbon backbone of the carboxylic acid may be linear, branched or aromatic. Preferably the mono- or poly-unsaturated carboxylic acid is a C16-C20 carboxylic acid. Preferred carboxylic acids are oleic, linoleic and cinnamic, most preferably the carboxylic acid is oleic acid.

Alternatively, the additive comprises an ester, anhydride or amide of a mono- or poly-unsaturated C14-C24 carboxylic acid in an amount of from 0.04 to 0.08 wt %, preferably 0.04 to 0.06 wt % by combined weight of the additive and polymer.

The carboxylic acid or an ester, anhydride or amide components are preferably "free" or "non-coordinated", in the sense that they do not form a part of a transition metal compound.

Where the additive comprises an ester of a mono- or poly-unsaturated C14-C24 carboxylic acid the alcohol component preferably comprises a C1-C30 alcohol, more preferably a saturated straight chain C1-C30 alcohol.

Where the additive comprises an anhydride of a mono- or poly-unsaturated C14-C24 carboxylic acid, the anhydride may or may not be symmetrical. The second carboxylic acid component preferably comprises a C1-C30 carboxylic acid, more preferably a saturated straight chain C1-C30 carboxylic acid.

Where the additive comprises an amide of a mono- or poly-unsaturated C14-C24 carboxylic acid the amide may be a primary, secondary or tertiary amide. Where a secondary or tertiary amide is present, each of the carbon chains preferably comprises from 1 to 30 carbon atoms, more preferably each carbon chain is a C1-C30 alkyl group.

Unless otherwise specified, where features of the carboxylic acid are discussed in this description it is intended to also encompass the ester, anhydride or amide thereof.

Without wishing to be bound by theory, it is believed that the mono- or poly-unsaturated C14-C24 carboxylic acid in the polymer composition autoxidises to yield peroxides which can attack the carbon-carbon linkages of the polymer chain, making the polymer susceptible to normal degradation processes. The presence of transition metals catalyse the autoxidation increasing the degradation rate of the composition.

Including more than 0.08 wt % mono- or poly-unsaturated C14-C24 carboxylic acid may cause the polymer to be excessively air sensitive. Excessive autoxidation of the carboxylic acid may cause relatively high peroxide concentrations and rapid breakdown of the polymer structure. This may cause shelf life issues. Conversely, including less than 0.04 wt. % mono- or poly-unsaturated C14-C24 carboxylic acid may lead to a negligible degradation rate. The inventors have found that including the between 0.04 and 0.08 wt. % mono- or poly-unsaturated C14-C24 carboxylic acid allows tuning of the degradation rate to desirable values for many applications.

Surprisingly, the present inventors have found that linear mono-unsaturated acids, and in particular oleic acid, show the greatest effect on degradation rate. This would not be expected by the chemical stability of these compounds in isolation since, in general, the more double bonds in a carboxylic acid the more susceptible to oxidation it is.

The additive comprises a synthetic rubber in an amount of from 0.04 to 0.2 wt %, preferably 0.08 to 0.12 wt %, most preferably about 0.1 wt % by combined weight of the additive and polymer. The following description uses the term rubber to refer to viscous, elastic polymers. Rubbers are amorphous polymers which exist at temperatures above their glass transition temperature. Preferably the rubber of the present invention is an unsaturated rubber, more preferably the rubber of the present invention comprises polyisoprene, styrene-isoprene, styrene-isoprene-styrene, or a blend of two or more thereof.

The rubber content may advantageously improve the mechanical properties of the polymer composition. Additionally, rubbers are generally less chemically stable than the bulk polyolefin. Accordingly, the rubber content may improve the degradation rate without adversely affecting the physical properties of the polymer. In this way it seems to act as a co-catalyst.

Advantageously, the presence of the synthetic rubber in the polymer composition improves the elasticity. This helps to counteract the embrittlement of the polymer composition caused by the other additives. Including less than 0.04% synthetic rubber may lead to the polymer being excessively brittle and unsuitable. Including more than 0.12% synthetic rubber may lead to rapid degradation rates and may adversely affect the material properties of the polymer. Additionally, it is believed that the synthetic rubber content increases the degradation rate without the need to increase the transition metal, starch, or carboxylic acid content.

The additive optionally comprises dry starch in an amount of from 0 to 20 wt %, preferably 0 to 10 wt %, more preferably 0.1 to 1 wt % and most preferably 0.1 to 0.4 wt % by combined weight of the additive and polymer. The following description uses the term starch to refer to a polysaccharide comprising a large number (general 500-2,000,000 monomer units) of glucose units joined by glycosidic bonds. The starch of the present invention is dry starch. That is, the starch contains less that 5 wt % water by weight of the starch, preferably less than 1 wt % water, most preferably the starch contains essentially no water.

Including large quantities of starch may increase the density and reduce the tensile strength of the polymer. Additionally, high starch contents may lead to shelf life problems due to rapid degradation. High starch contents make the polymer content susceptible to cosmetic and physical damage due to exposure to water and microorganisms. If insufficient starch is included the additive may have an insignificant effect on the biodegradation rate.

The additive optionally comprises calcium oxide in an amount of from 0 to 1 wt %, preferably from 0 to 0.4 wt %, more preferably from 0.1 to 0.3 wt % by combined weight of the additive and polymer. The following description uses the term calcium oxide to refer to the crystalline solid with the chemical formula CaO. Advantageously calcium oxide reacts with and immobilises water in the composition. This stabilises the composition during processing and may reduce the occurrence of blemishes and discoloration of the final product. Surprisingly and unexpectedly the present inventors have also found that increasing the calcium oxide content of the polymer composition may increase the degradation rate. Advantageously, the CaO content may be used to improve degradability without the need of increasing the transition metal of starch content. Including more than 0.4 wt % CaO leads to embrittlement of the polymer.

The additive optionally comprises an oxygen generating additive. Oxygen generating additives may be organic or inorganic. Preferably, the oxygen generating additive is selected from nitrates, peroxides, sulphates and phosphates or combinations of two or more thereof. Preferably the oxygen generating additive is calcium nitrate. Preferably the oxygen generating additive is present in an amount of from 0.1 to 1.0 wt % by combined weight of the additive and polymer. The oxygen-generating additive was found to further accelerate the rate of the oxidation of the polymer.

The additive optionally comprises a phenolic antioxidant stabilizer in an amount of from 0 to 0.2 wt %, preferably from 0.02 to 0.15 wt %. Phenolic antioxidant stabilisers are well known in the art and include, for example, Irganox 1076 and Irganox 1010. The phenolic antioxidant stabiliser was found to allow increased control over the timing of the degradation of the polymer. Specifically, the inclusion of a phenolic antioxidant stabiliser may delay the onset of degradation, increasing the shelf life of a product and the period in which the product may be recycled in existing polyolefin recycling streams.

Preferably the additive further comprises a colour additive, such as, but not exclusively carbon black or titanium oxide.

Accordingly, the present disclosure provides a sheet material made from a composition based on a specific combination of ingredients which permits the provision of an ideal degradable composition.

Preferably the sheet material has a mean thickness of from 100 to 500 microns, preferably 200 to 400 microns.

According to one embodiment the sheet material has an expanded gas-containing structure. That is, the sheet material can be provided with trapped internal voids which provide an insulating benefit to the user. For an expanded material the thickness may be preferably 1000 microns to 10 cm.

According to a further aspect there is provided packaging or a container formed of the sheet material as described herein.

In the preferred embodiment of a coffee cup, the cup preferably further comprises a component selected from the group consisting of a lid, a handle and a sleeve, wherein said component is also formed of the degradable composition.

The present disclosure provides a coffee cup made from a composition based on a specific combination of ingredients which permits the provision of an ideal degradable composition.

Preferably the cup has a wall thickness of from 100 to 500 microns, preferably 200 to 400 microns.

According to one embodiment the composition has an expanded gas-containing structure. That is, the cup wall can be provided with trapped internal voids which provide an insulating benefit to the walls of the cup to avoid the user burning their hands on a hot beverage. For an expanded cup the wall thickness may be from 400 to 3000 microns, preferably 1000 to 2000 microns.

According to a further aspect there is provided a method of forming a container, the method comprising:

forming a composition comprising 30 to 80 wt % calcium carbonate, an additive and a polymer, shaping the composition to form a container, wherein the polymer and additive are as described herein.

According to a further aspect there is provided a method of forming a disposable coffee cup, the method comprising:

forming a composition comprising 30 to 80 wt % calcium carbonate, an additive and a polymer, shaping the composition to form a coffee cup, wherein the polymer and additive are as described herein.

In the foregoing embodiments, the step of forming typically comprises mixing the components, optionally with the additive provided in a masterbatch concentrated composition, to form a composition.

Preferably the step of shaping the composition to form a container or coffee cup comprises moulding the composition into a container configuration, or forming and shaping one or more sheets of the composition into a container configuration and, optionally, fixing the configuration with heat-sealing or gluing, or 3D printing.

Preferably the shaping is by moulding such as by thermoforming, injection moulding, injection blow-moulding, or compression moulding. Shaping could alternatively include folding techniques. This could include pressure heat sealing. Advantageously, due to the polymer content, this can be achieved without the use of adhesive.

Preferably the method is for making the container or coffee cup described in detail above.

According to a further aspect there is provided a method of initiating the chemical degradation of the packaging or container as described herein, wherein the method comprises exposing the sheet material to temperatures in excess of 50° C., preferably by loading the container with a hot beverage or foodstuff, or by exposing the container to microwave heating. That is, the composition described herein is heat sensitive such that the use with, for example, a hot beverage starts the degradation. The degradation is slow, such that the container or packaging still serves its intended purpose, but degrades within the next few weeks after use. Preferably primary disintegration occurs substantially within 6 weeks, preferably within 4 weeks and secondary microbial digestion occurs substantially within 1 year, preferably within 6 months.

Primary degradation/disintegration described herein would preferably be 2-6 weeks and this can be demonstrated in fugitive (roadside, wasteland), soil and aerobic compost environments. Typically the primary degradation leaves the container with a compromised structural integrity such that it is no longer suitable for its original purpose. Microbial digestion of materials will be up from 6 months to 1 year provided that the sheet material is in an environment with suitable microorganisms. The degraded materials would become white chalk powder.

According to a further aspect there is provided a method of initiating the chemical degradation of a disposable coffee cup as described herein, wherein the method comprises exposing the coffee cup to temperatures in excess of 50° C., preferably by loading the coffee cup with a hot beverage. That is, the composition described herein is heat sensitive such that the use with a hot beverage starts the degradation. The degradation is slow, such that the cup still serves its intended purpose, but degrades within the next few weeks after use. Preferably primary disintegration occurs substantially within 6 weeks, preferably within 4 weeks and secondary microbial digestion occurs substantially within 1 year, preferably within 6 months.

According to another aspect there is provided the use of an additive to initiate degradation of a sheet material (or coffee cup) comprising said additive following exposure to temperatures in excess of 50° C., wherein the additive and sheet material composition are as described herein. Preferably the exposure to temperatures in excess of 50° C. comprises contacting the sheet material with a hot beverage or foodstuff, or exposing the sheet material (or coffee cup) to microwave heating.

The sheet material of the present invention seeks to solve the problem of incorrectly handled disposal of packaging and containers, such as coffee cups. Where consumers believe their container is recyclable, it is advantageous that the present invention provides a recyclable material which can be included in standard recycling processes since the ingredients are compatible with other recycled materials. Where consumers believe that their container is simply made of paper and will naturally degrade if discarded in a ditch, it is advantageous that the present invention provides a degradable material which will quickly degrade under such conditions.

Examples of specific applications for the sheet material discussed herein include paper plates, cartons for food/drink, packaging paper, food labels, horticulture/agriculture tags, drink straws, business cards, gift boxes and paper-like bags. These are particularly suitable for cast films. Other applications include disposable cutlery, disposable containers such as flower pots, yoghurt pots, takeaway food containers and hot/cold beverage cup lids, which can be made with thermoforming techniques. Other applications include degradable carrier bags, garbage bags, seed/grain bags, cement bags, and silage wrap, as well as food wraps such as burger sheets, all of which can be made with blown films. Expanded compositions could be employed as include single use insulating drinks/food containers, packaging materials, insulation, temporary plastic seating, bicycle seats, or bicycle helmets. Advantageously the material can be readily printed on.

All percentages used in this disclosure are by weight unless otherwise specified.

For the avoidance of doubt, an example is provided of the relative amounts. In a composition comprising 50 wt % calcium carbonate, 1 wt % additive and the balance (49 wt %) is polymer, a component of the additive which is 0.5 wt % of the combined weight of the polymer and additive, is 0.25 wt % of the whole composition.

The invention will now be described in relation to the following non-limiting examples.

EXAMPLES

An exemplary sheet formulation is described below.

Example Formulation for Thermoformed NMP Products

A sheet for forming a container (a coffee cup) was prepared from a composition of a polyolefin comprising of HDPE or PP, a copolymer or a blend PE/PP of Melt Flow Index of 10-30 g/10 mins, containing Calcium Carbonate of particle size 1-30 micron. To this was added a masterbatch additive formulation (0.2-5%) comprising a mixture of metal stearates, carboxylates, pro-oxidant such as metal nitrates, phosphates, calcium oxide, metal carbonate, dry starch and an unsaturated rubber. Carbon Black or other pigments can be added in 0.1-10% loadings for coloration Example Formulation for Film Blown Products A sheet for forming a container was prepared from a Polyolefin comprising of HDPE, LLDPE or PP, a copolymer or blend of Melt Flow Index 0.2-2 g/10 mins, containing Calcium Carbonate of particle size of particle size 1-30 micron, and an additive formulation (0.1-5%) comprising a mixture for metal stearates as above, with addition of Carbon Black as a colorant.

Example Formulation for Expanded PP Products

An expanded PP grade resin was prepared containing Calcium carbonate from 30-50% with average diameter from 0.1 to 5 micron, would contain a 0.1-5% of the additive describe herein, containing dry starch, unsaturated rubber and a mixture of metal catalysts. This was shaped into the form of a coffee cup.

Specific Formulations

The following formulations were used to form a plastic suitable for forming a coffee cup by the addition of further HDPE and calcium carbonate. The calcium carbonate represented 50 wt % of the mixture, and the HDPE represented 48 w % of the mixture. The cups were tested under extreme weathering conditions and demonstrated fast decomposition. In addition, the cups had a good paper-like feel and suitable strength for the intended application.

Formulation 1

An additive formulation was prepared consisting of:

| | | |
|---|---|---|
| i) | Dried starch | 10.00 wt. % |
| ii) | Manganese stearate | 4.00 wt. % |
| iii) | Ferric stearate | 8.00 wt. % |
| iv) | Copper stearate | 1.30 wt. % |
| v) | Oleic acid | 2.00 wt. % |
| vi) | SIS/SI copolymer | 4.00 wt. % |
| vii) | Calcium oxide | 10 wt. % |
| viii) | LLDPE | 60.70 wt. % |

Formulation 2

An additive formulation was prepared consisting of:

| | | |
|---|---|---|
| i) | Dried starch | 10.00 wt. % |
| ii) | Manganese stearate | 2.00 wt. % |
| iii) | Ferric stearate | 10.00 wt. % |
| iv) | Irganox 1076 | 13.00 wt. % |
| v) | Oleic acid | 1.00 wt. % |
| vi) | SIS/SI copolymer | 2.00 wt. % |
| vii) | Calcium oxide | 10.00 wt. % |
| viii) | LLDPE | 52.0 wt. % |

Formulation 3

An additive formulation was prepared consisting of:

| | | |
|---|---|---|
| i) | Dried starch | 10.00 wt. % |
| ii) | Manganese stearate | 4.00 wt. % |
| iii) | Copper stearate | 8.00 wt. % |
| iv) | Oleic acid | 6.00 wt. % |
| v) | SIS/SI copolymer | 2.00 wt. % |
| vi) | LLDPE | 70.00 wt. % |

Example formulations 1, 2 and 3 were formed by hot extruding components ii-viii then separately adding the starch. By adding the starch separately it may be added after the heating steps, avoiding damaging the structure.

Formulation 4

An additive formulation was prepared consisting of:

| | | |
|---|---|---|
| i) | Manganese stearate | 4.00 wt. % |
| ii) | Ferric stearate | 8.00 wt. % |
| iii) | Copper stearate | 1.30 wt. % |
| iv) | Oleic acid | 6.00 wt. % |
| v) | SIS/SI copolymer | 1.00 wt. % |
| vi) | Calcium oxide | 0.00 wt. % |
| vii) | LLDPE | 69.70 wt. % |

Formulation 5

An additive formulation was prepared consisting of:

| | | |
|---|---|---|
| i) | Manganese stearate | 4.00 wt. % |
| ii) | Ferric stearate | 8.00 wt. % |
| iii) | Copper stearate | 1.30 wt. % |
| iv) | Oleic acid | 2.00 wt. % |
| v) | SIS/SI copolymer | 1.00 wt. % |
| vi) | Calcium oxide | 10.00 wt. % |
| vii) | Irganox 1076 | 10.00 wt. % |
| viii) | LLDPE | 63.70 wt. % |

Example formulations 4 and 5 were formed by hot extruding the components.

The compositions are summarised below:

| | 1 | 2 | 3 | 4 | 5 |
|---|---|---|---|---|---|
| i) Dried starch | 10.0 | 10.0 | 10.0 | | |
| ii) Manganese stearate | 4.0 | 2.0 | 4.0 | 4.0 | 4.0 |
| iii) Ferric stearate | 8.0 | 10.0 | | 8.0 | 8.0 |
| iv) Copper stearate | 1.3 | | 8.0 | 1.3 | 1.3 |
| v) Oleic acid | 2.0 | 1.0 | 6.0 | 6.0 | 2.0 |
| vi) SIS/SI copolymer | 4.0 | 2.0 | 2.0 | 1.0 | 1.0 |
| vii) Calcium oxide | 10.0 | 10.0 | | 10.0 | 10.0 |
| viii) LLDPE | 60.7 | 52.0 | 70.0 | 69.7 | 63.7 |
| ix) Irganox 1076 | | 13.0 | | | 10.0 |

Although preferred embodiments of the invention have been described herein in detail, it will be understood by those skilled in the art that variations may be made thereto without departing from the scope of the invention or of the appended claims.

The invention claimed is:

1. A sheet material formed of a degradable composition, the composition comprising:
   30 to 80 wt % calcium carbonate by weight of the composition;
   an additive; and
   the balance a polymer selected from polyethylene, polypropylene and copolymers and blends thereof,
   wherein the additive comprises, by combined weight of the additive and the polymer:
   (a) two or more transition metal compounds in a total amount of from 0.15 to 0.6 wt %;
   (b) a mono- or poly-unsaturated $C_{14}$-$C_{24}$ carboxylic acid, or an ester, anhydride or amide thereof, in an amount of from 0.04 to 0.08 wt %;
   (c) a synthetic rubber in an amount of from 0.04 to 0.2 wt %;
   and, optionally:
   (d) dry starch in an amount of from 0 to 20 wt %; and/or
   (e) calcium oxide in an amount of from 0 to 1 wt %; and/or (f) a phenolic antioxidant stabilizer in an amount of from 0 to 0.2 wt %;

wherein the two or more transition metal compounds are selected from iron, manganese, copper, zinc, titanium, cobalt and cerium compounds and wherein the transition metals in the two or more transition metal compounds are different.

2. The sheet material according to claim 1, wherein the composition comprises from 60 to 70 wt % calcium carbonate.

3. The sheet material according to claim 1 having a mean thickness of from 100 to 500 microns, preferably 200 to 400 microns.

4. The sheet material according to claim 1, wherein the composition has an expanded gas-containing structure.

5. The sheet material according to claim 1, wherein the transition metal compounds comprise moieties selected from stearate, carboxylate, carbonate, acetylacetonate, triazacyclononane or combinations of two or more thereof.

6. The sheet material according to claim 1, wherein the transition metal in the two or more transition metal compounds comprise:
   (i) iron, manganese and copper; or
   (ii) manganese and copper; or
   (iii) iron and manganese.

7. The sheet material according to claim 1, wherein the composition comprises an oxidising additive.

8. The sheet material according to claim 1, wherein the mono- or poly-unsaturated $C_{14}$-$C_{24}$ carboxylic acid is a $C_{16}$-$C_{20}$ linear carboxylic acid, preferably oleic acid; and/or
   wherein the synthetic rubber comprises an unsaturated polymer, preferably styrene-isoprene-styrene, more preferably a blend of a styrene-isoprene-styrene and a styrene-isoprene copolymer; and/or
   wherein the polymer is HDPE, preferably having a melt-flow index of from 10 to 20.

9. The sheet material according to claim 1, wherein the composition comprises, by combined weight of the additive and the polymer:
   (b) two or more transition metal stearates in a total amount of from 0.2 to 0.3 wt %; and/or
   (c) a mono-unsaturated $C_{16}$-$C_{20}$ linear carboxylic acid in an amount of from 0.04 to 0.06 wt %; and/or
   (d) a synthetic rubber in an amount of from 0.08 to 0.12 wt %; and/or
   (e) dry starch in an amount of from 0.1 to 0.4 wt %; and/or
   (f) calcium oxide in an amount of from 0.1 to 0.3 wt %; and/or
   (g) calcium nitrate in an amount from 0.1 to 1.0 wt %.

10. The sheet material of claim 1 formed into a package or a container.

11. The sheet material of claim 1 in the form of a coffee cup in combination with a component selected from the group consisting of a lid, a handle and a sleeve, wherein said component is also formed of the degradable composition.

12. A method of forming a container, the method comprising:
   forming a composition comprising 30 to 80 wt % calcium carbonate by weight of the composition, a polymer and an additive,
   shaping the composition to form a container,
   wherein the polymer is selected from polyethylene, polypropylene and copolymers and blends thereof, and
   wherein the additive comprises, by combined weight of the additive and the polymer:
      (a) two or more transition metal compounds in a total amount of from 0.15 to 0.6 wt %;
      (b) a mono- or poly-unsaturated $C_{14}$-$C_{24}$ carboxylic acid, or an ester, anhydride or amide thereof, in an amount of from 0.04 to 0.08 wt %;
      (c) a synthetic rubber in an amount of from 0.04 to 0.2 wt %;
   and, optionally:
      (d) dry starch in an amount of from 0 to 20 wt %; and/or
      (e) calcium oxide in an amount of from 0 to 1 wt %; and/or
      (f) a phenolic antioxidant stabilizer in an amount of from 0 to 0.2 wt %;
   wherein the two or more transition metal compounds are selected from ferric, manganese, copper, zinc, titanium, cobalt and cerium compounds and wherein the transition metals in the two or more transition metal compounds are different.

13. The method according to claim 12, wherein the step of shaping the composition to form a container comprises:
   (a) moulding the composition into a container configuration, preferably by thermoforming, injection moulding, injection blow-moulding, or compression moulding; or
   (b) forming and shaping one or more sheets of the composition into a container configuration and, optionally, fixing the configuration with heat-sealing or gluing; or
   (c) 3D printing.

14. The method according to claim 12 wherein the container is a package or a coffee cup.

15. A method of initiating the chemical degradation of packaging, a container, or a coffee cup formed from the sheet material of claim 1, wherein the method comprises exposing the sheet material to temperatures in excess of 50° C., preferably by loading the container with a hot beverage or foodstuff, or by exposing the container to microwave heating.

16. The method according to claim 15, wherein primary disintegration occurs substantially within 6 weeks and secondary microbial digestion occurs substantially within 1 year.

17. The method according to claim 1 wherein the container is a coffee cup.

* * * * *